United States Patent Office 3,311,409
Patented Mar. 28, 1967

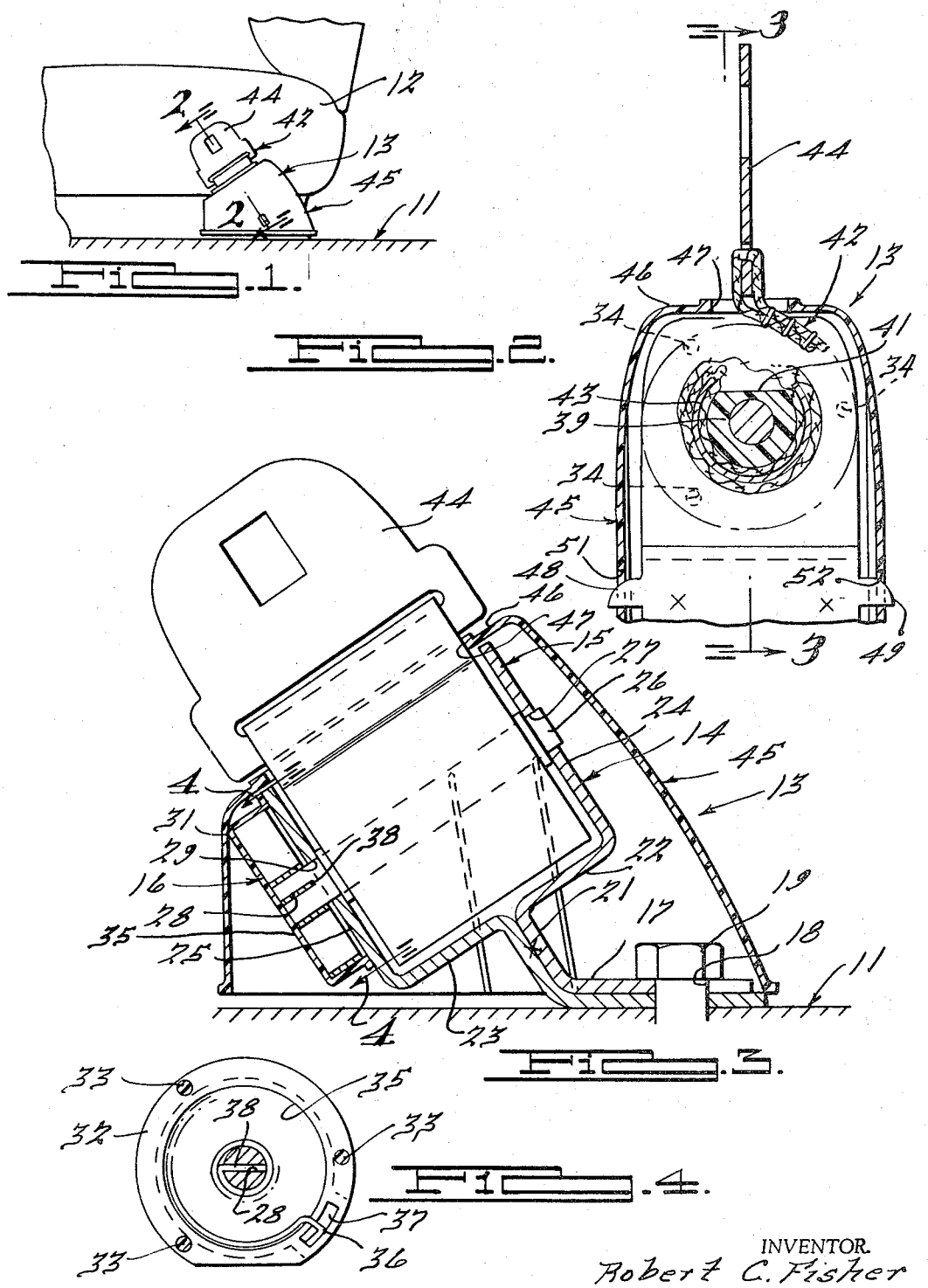

3,311,409
SEAT BELT RETRACTOR
Robert C. Fisher, 580 E. Long Lake Road,
Bloomfield Hills, Mich. 48013
Filed Mar. 17, 1965, Ser. No. 440,553
3 Claims. (Cl. 297—388)

This invention relates generally to vehicle seat belts, and more particularly to a retractor for a vehicle seat belt.

The widespread acceptance of safety seat belts in vehicles, particularly automobiles, has created the need for an improved seat belt retractor for the end of the belt adjacent to the vehicle door. In vehicles not having such a seat belt retractor, the end portion of the belt adjacent to the door often falls out of the vehicle when the door is opened, requiring that it be replaced on the vehicle seat or adjacent floor prior to closure of the door. When the free end portion of the belt has a metal component attached thereto, for example, a metal tongue or portion of a seat belt buckle, the situation is aggravated since the tongue may become jammed between the door and the door frame, resulting in damage thereto, abrasion of the seat belt or jamming of the door.

If a retractor mechanism is provided, one end of the seat belt must be secured to the retractor mechanism to permit its retraction. The attachment of the seat belt to the retractor mechanism, however, should be such that frequent extension and retraction of the seat belt does not weaken the portion of the belt that is attached to the retractor mechanism.

In accordance with the instant invention, a seat belt retractor is positioned adjacent the side of a vehicle seat. The retractor comprises a bracket having upstanding spaced arms and an offset mounting portion that is adapted to be secured to the vehicle body in a manner that facilitates installation and minimizes unequal stressing of the belt. A shaft is journaled at one of its ends in one of the arms and the other end of the shaft extends through the other of the arms and is journaled therein. An enlarged diameter hub portion is affixed to the portion of the shaft that extends between the arms to provide a means for attaching a seat belt end thereto. A retraction spring retainer is fixed to the arm through which the shaft extends and overlies and encloses the respective shaft end. A coiled torsional retraction spring is contained within the spring retainer. One end of the retraction spring is affixed to the retainer and its other end is affixed to the shaft whereby the spring will be tensioned upon rotation of the shaft due to extension of the belt.

Accordingly, one object of the instant invention is an improved seat belt retractor.

Another object is an improved means for securing a seat belt to a seat belt retractor.

Another object is a seat belt retractor that orients the buckle end portion of the belt for easy access.

Other objects and advantages of the instant invention will become apparent from the following specification, claims and drawings, wherein:

FIGURE 1 is a partial side elevational view of a portion of a motor vehicle embodying this invention;

FIGURE 2 is an enlarged cross-sectional view taken along the line 2—2 of FIGURE 1;

FIGURE 3 is a cross-sectional view taken along the line 3—3 of FIGURE 2; and

FIGURE 4 is a cross-sectional view taken along the line 4—4 of FIGURE 3.

Referring now in detail to the drawings, a portions of the floor of a motor vehicle, such as an automobile, is indicated generally by the reference numeral 11. A seat 12 is supported upon the floor 11 and a seat belt and seat belt retractor mechanism, indicated generally by the reference numeral 13, is positioned upon the floor 11 contiguous to the rear edge of the seat 12 at each side thereof, although only one side is shown in the drawings. It is to be understood that the construction at the opposite side of the seat is identical to that described.

The retractor mechanism 13 comprises a sheet metal mounting bracket 14 comprised of first and second sheet metal parts 15 and 16, respectively. The parts 15 and 16 are joined as by spot welding at their lower ends to form a mounting portion 17 that extends parallel to the floor 11 and has an aperture 18 extending therethrough. An anchor bolt 19 passes through the aperture 18 and is fixed to a suitable mounting means formed on the floor 11 (not shown).

The mounting portion 17 terminates at one side in an angularly disposed, upstanding portion 21 from which each of the sheet metal parts 15 and 16 diverge to form leg parts 22 and 23 of a U-shaped journal portion. The leg part 22 of the sheet metal part 15 terminates in an upstanding arm 24 that extends upwardly and forwardly toward the front and top of the seat 12. The leg part 23 likewise terminates in an upwardly and forwardly extending arm 25 that is spaced from the arm 24.

A steel shaft 26 extends through and is journaled within an aperture 27 formed in the arm 24. The other end of the shaft 26 is slotted, as at 28, and extends through an aperture 29 in the other arm 25. A plastic retractor spring retainer 31 having a generally cup-shape terminating in an outwardly extending flange 32 surrounds and encloses the slotted shaft end 28. Three tabs or locking fingers 33 extend upwardly from the flange 32 and through apertures 34 (FIGURE 2) in the arm 25 to lock the retainer 31 to the mounting bracket 14. A coiled torsional spring 35 has one of its ends 36 affixed within a cavity 37 provided in the spring retainer 31. The other end 38 of the spring 35 is retained in the slotted end 28 of the shaft 26.

The shaft 26 is press fitted into a plastic hub 39 having a flattened portion 41 between the arms 24 and 25 to axially locate the shaft 26 therebetween. A seat belt portion 42 has one end of its web stitched around the hub 39. A horseshoe-shaped sheet metal retainer 43 grasps this end of the seat belt portion 42. The retainer 43 has its ends overlying the flattened portion 41 of the hub 39 to prevent relative rotation of the seat belt 42 with respect to the hub 39. The opposite end of the seat belt 42 is stitched around a tongue 44 or other portion of a seat belt buckle.

A plastic shield 45 has side walls that surround the bracket 14 and engage the floor 11 at their lower ends. The other end of the side walls are interconnected by an integral upper wall 46 in which an elongated aperture 47 is provided. The aperture 47 is of sufficient size to permit free movement of the belt 42 therein, but the lower portion of the tongue 44 is too large to pass within the aperture 47.

The bracket 14 has a pair of integral, outwardly extending tabs 48 and 49 that are received in apertures 51 and 52 in opposite side walls of the shield 45. The shield 45 is formed from a resilient plastic so that it may be snapped onto the tabs 48 and 49 to retain the shield relative to the floor 11 and the bracket 14.

The retractor spring 35 is preloaded so that the shaft 26 will be rotated to coil the belt 42 around the hub 39 until the tongue 44 engages the shield wall 46. When the seat belt is retracted by drawing the tongue 44 outwardly from the shield 45, the spring 35 will be tensioned due to the relative rotation between its ends. Therefore, when the seat belt is again released, the spring 35 will retract the seat belt 42 winding it around the hub 39.

It should be noted that the arms 24 and 25 hold the shaft 26 at an angle and the tongue 44 is disposed upwardly and forwardly with respect to the seat 12 so that it may be freely grasped to be withdrawn. The angle of the shaft 26 is also such that the belt 42 will be drawn tangentially off of the shaft 26 without flexing of the belt. Since the belt 42 need not be flexed, it will experience an even tension and will not be subjected to wear due to a scuffing action along its edges by the shield 45.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A seat belt retractor adapted to be positioned at the side of the vehicle seat comprising
   bracket means comprising first and second sheet metal members having upstanding arms and
   offset mounting portions, respectively, the mounting portions of said members being disposed in juxtaposed relation and the arms thereof in spaced relation, the mounting portions having aligned apertures therein to facilitate attachment of said retractor to the vehicle and the spaced arms having aligned bearing apertures therein,
   a shaft journaled at one end in the bearing aperture one of said arms, the other end of said shaft extending through the bearing aperture other of said arms and being journaled therein,
   a hub affixed to said shaft between said arms for locating said shaft relative to said arms,
   a seat belt,
   means affixing one end of said seat belt to said hub,
   a retraction spring retainer fixed to the other of said arms and overlying and enclosing said other shaft end, and
   a coiled torsional retractor spring cooperating with said spring retainer, one end of said torsion spring being affixed to said spring retainer and the other end thereof being affixed to said other shaft end for tensioning of said spring upon rotation of said shaft due to extension of said belt.

2. A supporting bracket for a seat belt retractor comprising
   a pair of sheet metal parts having mounting portions affixed together in juxtaposed relation in a first area, said mounting portions having aligned apertures therein to facilitate attachment of said retractor to a surface, each of said parts having,
   an offset portion integrally connected to said mounting portion and extending at an obtuse angle thereto said offset portions being secured to one another in juxtaposed relation,
   each of said parts having base portions diverging from said juxtaposed offset portions at substantially a right angle to form the bight of a U-shaped portion,
   said parts having arms extending parallel to each other at a spaced relationship at opposite ends of said base portions to form the legs of said U-shaped portion, and
   a pair of axially aligned spaced journals formed in said legs and defining an inclined axis of rotation disposed at an angle to the surface upon which said mounting portion is affixed.

3. A seat belt retractor adapted to be positioned at the side and rear edge of a vehicle seat comprising
   bracket means having
   an offset mounting portion having an aperture therein to facilitate attachment of said retractor to the vehicle body,
   a pair of upstanding spaced arms integrally connected to said mounting portion and extending upwardly and forwardly therefrom toward the front and top surface of the seat,
   a pair of tabs integrally formed in said bracket and extending from opposite sides thereof,
   a shaft journaled at one end in one of said arms, the other end of said shaft extending through the other of said arms and being journaled therein,
   a plastic hub press fitted to said shaft between said arms,
   a seat belt,
   a seat belt buckle portion affixed to one end of said seat belt,
   means affixing the other end of said seat belt to said hub,
   a retraction spring retainer fixed to the other of said arms and overlying and enclosing said other shaft end,
   a coiled torsional retraction spring contained within said spring retainer and encircling said other shaft end, one end of said retraction spring being affixed to said spring retainer and the other end of said retraction spring being affixed within a slot in said other shaft end for tensioning of said spring upon rotation of said shaft due to extension of said belt,
   a shield having side walls adapted to enclose the retraction mechanism, the lower end of said side walls being adapted to abuttingly engage the vehicle body,
   apertures in opposite sides of said shield receiving said tabs for fixing said shield relative to said bracket,
   an upper wall integrally connected to the upper end of said side walls, and
   an aperture in said upper wall, said aperture being of sufficient size to permit free movement of said belt therein but being of insufficient size to pass said buckle part thereby limiting the retraction of said belt into said shield.

References Cited by the Examiner
UNITED STATES PATENTS

| | | | |
|---|---|---|---|
| 2,814,504 | 11/1957 | Campbell | 280—150 |
| 2,861,627 | 11/1958 | Smith | 297—388 |
| 3,046,056 | 7/1962 | Greene et al. | 297—385 |
| 3,147,996 | 9/1964 | Ferrara et al. | 297—388 |
| 3,174,704 | 3/1965 | Replogle | 242—107.4 |

FRANK B. SHERRY, *Primary Examiner.*

CASMIR A. NUNBERG, *Examiner.*